United States Patent Office 3,558,530
Patented Jan. 26, 1971

3,558,530
FOAMED AND FOAMABLE COPOLYMERS
Günter Schröder, Ober-Ramstadt-Eiche, and Wolfgang Ganzler, Darmstadt, Germany, assignors to Rohm & Haas G.m.b.H., Darmstadt, Germany
No Drawing. Filed July 25, 1967, Ser. No. 655,766
Claims priority, application Germany, July 29, 1966, R 43,794
Int. Cl. C08f 15/36, 37/18, 47/10
U.S. Cl. 260—2.5
12 Claims

ABSTRACT OF THE DISCLOSURE

Improvement in uniformity of foaming copolymers of (A) acrylic or methacrylic acid and (B) acrylonitrile, acrylamide, methacrylonitrile or methacrylamide and, if desired, (C) additional comonomer in the presence of 3 to 20 percent urea or dimethylurea by dissolving in the monomer mix, before copolymerization, 0.5 to 10 percent by weight of a vinyl copolymer.

---

This invention relates to improvements in the heat-foamable, thermoplastic copolymers, the method of preparing such copolymers, the method of foaming them, and to the heat-foamed copolymers prepared therefrom described in copending application Ser. No. 487,032 filed Sept. 13, 1965, and now abandoned.

The copolymers described in said copending application are prepared by copolymerizing, in the presence of 3 to 20 percent by weight urea or N,N'-dimethylurea and an organic radical-forming copolymerization catalyst, (A) 10 to 60 percent by weight acrylic acid, methacrylic acid or a combination thereof with (B) 20 to 60 percent by weight acrylonitrile, acrylamide, methacrylonitrile, methacrylamide or a combination thereof and, optionally, (C) up to about 60 percent by weight of one or more compounds copolymerizable with said comonomers, e.g., styrene, α-methyl styrene, lower alkyl (particularly methyl and butyl) acrylates and methacrylates, vinyl acetate, itaconic acid, esters thereof, itaconic acid amide or nitrile, and polymerizable heterocyclic compounds such as vinyl pyridine or N-vinyl-2-pyrrolidone, and (D) up to about 5 percent by weight of water. Heat-foamable copolymers are obtainable by heating the monomer mixture to 20 to about 120° C. and these are foamed by subsequent heating to about 150° to 250° C.

While the foamed copolymers thus obtained have a very desirable combination of properties in that they have high thermal dimensional stability, excellent resistance to solvents, low density and good hardness, bending or flexural strength, impact strength, notched-bar impact strength, tensile strength and compression strength, they often lack uniformity of foam structure and pore size. This has the undesirable result that the foamed bodies have zones of different mechanical stability and heat-insulating characteristics. These differences vary from batch to batch because it is impossible to obtain foamed products of completely uniform quality. These differences are even more serious with foamed bodies prepared from synthetic resin granules inasmuch as these cannot be prepared with densities of less than 150 grams per liter because of an appreciable proportion of granules that are foamed only slightly or not at all.

Although different zones cannot be distinguished visually in the foamed bodies thus obtained, the characteristics of the foam lead to the conclusion that there are one or more phases during the polymerization in the course of which a polymer is formed which is insoluble in the monomer mix, and that this polymer is precipitated or settles and forms a layer or stratum in the final polymer block. It is believed that when the different strata foam at different temperatures, the first stratum to foam, because of its greatly diminished heat conductivity, inhibits the heating and foaming of the adjacent stratum. In a synthetic resin granulate, the portion foamable at low temperature is distributed uniformly and, upon foaming, reduces the flow of heat to the other portions on all sides so that foaming ceases at a relatively high density.

It has now been found that it is possible to obtain uniformly foamed synthetic materials by dissolving in the initially described mixture of monomers and urea component, before commencement of the polymerization, from about 0.5 to about 10 percent by weight, calculated on the weight of polymerizable compounds, of a vinyl copolymer that is soluble in the mixture and at least 10 percent of which is made up of structural units of the formulae

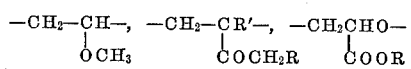

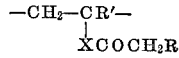

or

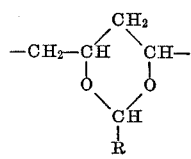

in which R is hydrogen or alkyl, preferably lower alkyl of 1 to 6 carbon atoms, R' is hydrogen or methyl, and X is —O—, phenylene, —COO—alkylene—O—, —COO—alkylene— or —alkylene—O— in which alkylene is preferably alkylene of 1 to 6 carbon atoms, or a combination of such structural units.

The vinyl copolymer dissolved in the monomer mix therefore includes units of, e.g., a vinyl ether such as vinylmethyl ether, acrylic acid or an ester thereof such as methyl-, ethyl-, butyl- and hexyl acrylate, a vinyl ester such as vinyl acetate and vinyl propionate, as well as acetylstyrene and acetoxyethyl methacrylate. To the extent that the vinyl copolymer is not a copolymer composed entirely of the above-identified structural units, it may also have other components which have at least limited solubility and preferably good solubility in the monomer-urea component mixture. Such components include methacrylic acid, lower alkyl and hydroxy alkyl esters thereof, dialkylaminoalkyl methacrylates, N-alkylamides of acrylic and methacrylic acids, N-hydroxy- and N-alkoxyalkylamides of acrylic and methacrylic acids, maleic anhydride, maleic and fumaric acids, alkyl esters of maleic and fumaric acids, N-vinyl pyrrolidone, N-vinylcarbazol, vinyl alcohol, vinyl chloride, styrene and its homologs, as well as minor proportions of acrylonitrile and methacrylonitrile. Such vinyl polymers as vinyl chloride-vinyl acetate copolymers, lower alkyl acrylate-lower alkyl methacrylate copolymers and beta-acyloxyalkyl-methacrylate or acrylate-methacrylate copolymers are particularly suitable for the purposes of this invention.

While no theory has as yet been developed to explain the activity of the vinyl copolymer additive, there is basis for assuming that it performs two different functions. On the one hand, it increases significantly the viscosity of the monomer mix, thus inhibiting separation of difficulty soluble components during the initial phase of the polymerization. On the other hand, the additive exerts a dispersing effect which is dependent on the presence of the earlier identified structural units because without them polymers that are readily soluble in the monomer mix are ineffective in achieving the results of the invention. Apparently the dispersing effect inhibits coagulation of insoluble polymer components into drops or flocks having a greater tendency to sedimentation.

The copolymerization of the monomers containing the vinyl copolymer dissolved therein to an unfoamed, thermoplastic copolymer is carried out, in the presence of a catalyst, at a temperature within the range of about 20 to 100° C., depending upon a number of factors, particularly the effectiveness of the catalyst chosen for the copolymerization. Temperatures of at least about 40° C. are desirable to avoid unduly prolonged copolymerization times and generally poor results. Temperatures of about 50° to 60° C. are preferred for uniformly excellent results. The time of copolymerization varies widely and is readily ascertainable by trial and error. At the preferred temperature of 50 to 60° C., 30 to 80 hours are ordinarily sufficient.

Under such conditions about 80% of the monomers copolymerize to yield solid copolymers in which the remaining monomers are dissolved. The monomers are also polymerizable in accordance with conventional practice by tempering the solid copolymer at a somewhat higher temperature, e.g., about 100 to 120° C. for usually about one to four hours, whereby completely copolymerized, solid thermoplastic bodies such as plates are obtained which can then be foamed as such or after granulation.

These thermoplastic copolymers are then capable of being foamed by heating to a temperature of the order of about 150 to 250° C., preferably about 200 to 230° C. If they are initially, i.e., in the unfoamed state, in the form of plates or the like, the resulting foamed copolymers have densities of the order of about 20 to over 100 grams per liter, depending upon the choice of amount of foaming agent and preselected volume. Resin granulates are preferably foamed in two steps, the first step resulting in a prefoamed granulate that is converted to a foamed body in the second step. The method of the invention is particularly advantageous for the foaming of granulates because of the absence of unfoamed portions in foamed bodies produced therefrom. It is believed that a cyclization takes place by intramolecular rearrangement if component B is a nitrile and by condensation to a cyclic imide grouping if component B is an amide. The foamed product loses its thermoplasticity more or less completely.

All the thermoplastic copolymers which can be produced in accordance with the invention have the property in common that upon the heating which is necessary for the foaming, an imidization occurs within the macromolecule and ring-shaped acryl- or methacrylimide units are developed. A prerequisite for this cyclization reaction is that the groupings which participate in the ring-formation be spatial neighbors. It is known that the two components in a copolymer consisting of equal molar proportions of for instance methacrylic acid and methacrylonitrile are present in the macromolecule in a statistical distribution, i.e., their distribution is not strictly alternating. Accordingly, even under these conditions a quantitative formation of imides during the heating cannot be expected. In addition to the intramolecular rearrangement which takes place during the heating, an intermolecular imide formation and thus a slight cross-linking of the foamed final product also takes place to a slight extent. This is of practical importance for the dimensional stability and solvent-resistance of the final product.

The development of the building blocks of the formula

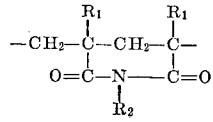

in which $R_1$ is hydrogen or $CH_3$ and $R_2$ is hydrogen or a lower alkyl radical, which building blocks determine the properties of the new product, can be effected in accordance with different cyclization mechanisms. The ring-shaped imide can be produced from acrylic or methacrylic acid and acrylo- or methacrylonitrile, from acrylamide or methacrylimide and a lower alkyl acrylate or methacrylate or from acrylamide or methacrylamide and acrylic or methacrylic acid. Acrylates and methacrylates which are present in the structure of the plastics prepared in accordance with the invention can participate in the cyclization reaction which takes place upon heating and/or they act as comonomers which modify the properties of the final product.

The method of this invention can be modified in a number of ways without departing from its essential features. This includes the addition of plasticizers, such as dibutylphthalate, the introduction of known flame-inhibiting additives, such as phosphoric acid, phosphoric esters or chloroparaffins, and the addition of filling materials which improve the mechanical strength of the resultant foam.

The polymerization of the monomers can be carried out in customary fashion under the action of organic radical-forming polymerization accelerators which contain a peroxide or azo group bound to hydrogen or a non-aromatic carbon atom. The new products can be produced as bulk copolymers and foamed either as such or after granulation. In the latter case, it is advisable to produce a granulate having a minimum diameter of 3 mm. Upon the bulk polymerization of the monomer mixture, it may be advisable, particularly in case of the simultaneous use of larger quantities of urea, of for instance 10 to 20% by weight, to add water as a solubilizer in quantities of 1 to 5% by weight, referred to the monomer mixture. Plastics which are produced in accordance with the present invention by copolymerization of acrylic or methacrylic acid with methacrylonitrile and styrene or methylmethacrylate in a monomer mix containing a vinyl chloride-vinyl acetate, ethyl acrylate-methyl methacrylate or β-acetoxyethyl methacrylate-methylmethacrylate copolymer are particularly preferred due to the good mechanical properties of the foam produced therefrom. Products prepared from acrylic or methacrylic acid, acrylamide and methylmethacrylate with the aforementioned vinyl copolymers produce white foams of excellent temperature stability and resistance to solvents.

Although the processes which take place upon the heating of the new thermoplastic copolymer are not yet entirely known, it is believed that the urea component, i.e., urea or dimethyl urea, not only has the role of a blowing agent, which decomposes for instance into ammonia and carbon dioxide, but that the urea and/or its decomposition products also participate as reactants in the development of the foamed plastics produced in accordance with the invention. Infra-red spectographic investigations have indicated that, other conditions being equal, the absence of a urea component results in products having acid anhydride groups while, with the simultaneous use of a urea component, such groups are transformed into the imide groups.

The advantages and further details of the process and products of this invention will become more apparent from the following examples, in which the relative proportions of the comonomers and vinyl polymers are set forth in parts by weight (pbw.) and the term "tempered" is used in the sense in which it was used earlier, unless otherwise noted.

EXAMPLE 1

Five pbw. of a vinyl chloride-vinyl acetate copolymer having a vinyl acetate content of about 40% are dissolved in a mixture of 55 pbw. methacrylonitrile, 45 pbw. methacrylic acid and 5 pbw. urea. After addition of 0.2 pbw. dibenzoylperoxide, the solution is polymerized in 16 hours at 60° C. to a turbid, yellow plate and then tempered at 100° C. for three additional hours.

By heating this plate to 220° C. for two hours, it foams to an even, uniform foamed plate with a density of 29 grams per liter.

EXAMPLE 2

Five pbw. of a 30% dispersion (corresponding to 1.5 pbw. polymer) of an ethyl acrylate-methyl methacrylate copolymer having an ethyl acrylate content of about 67% are added to a mixture of 55 pbw. methacrylonitrile, 45 pbw. methacrylic acid and 5 pbw. urea. After addition of 0.2 pbw. dibenzoylperoxide, the mixture is polymerized in 40 hours at 60° C. to a turbid plate and then tempered at 100° C. for three additional hours.

Upon heating to 220° C. for one hour, the polymer plate is foamed to a smooth, uniform foamed plate having a density of about 37 grams per liter.

EXAMPLE 3

Two pbw. of a copolymer of 20 parts β-acetoxyethyl methacrylate and 80 parts methylmethacrylate are dissolved in 45 pbw. methacrylic acid. To this solution, 55 pbw. methacrylonitrile, 5 pbw. urea and 0.2 pbw. dibenzoylperoxide are added, and the mixture is polymerized in 48 hours at 60° C. to a turbid, yellow plate and then tempered at 100° C. for three additional hours.

Upon heating to 240° C. for one hour, the plate is foamed to a smooth, uniform foamed plate having a density of about 30 grams per liter.

EXAMPLE 4

Five pbw. of a copolymer of 15 parts β-acetoxyethyl methacrylate and 85 parts methylmethacrylate are dissolved in 45 pbw. methacrylic acid. To this solution, 55 pbw. methacrylonitrile, 5 pbw. urea and 0.2 pbw. dibenzoylperoxide are added, and the mixture is polymerized in 40 hours at 60° C. to turbid, light-yellow plate and then tempered at 100° C. for three additional hours.

Upon heating to 240° C. for one hour, the plate is foamed to a smooth, uniform foamed plate having a density of about 30 grams per liter.

What is claimed is:

1. In a process for preparing a heat-foamable thermoplastic copolymer which comprises copolymerizing, in the presence of 3 to 20 percent by weight urea or di-methyl-urea and a catalytically effective amount of an organic radical-forming catalyst, a monomer mixture consisting essentially of (A) 10 to 60 percent by weight acrylic acid, methacrylic acid or a combination thereof with (B) 20 to 60 percent by weight acrylonitrile, acrylamide, methacrylonitrile, methacrylamide or a combination thereof, the improvement which comprises adding to the monomer mixture, before copolymerization, from about 0.5 to about 10 percent by weight of a vinyl copolymer soluble in said monomer mixture and at least 10 percent of which is made up of structural units of the formulae

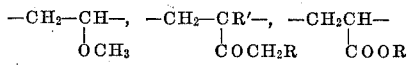

or

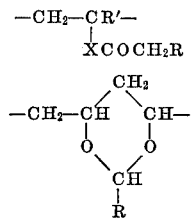

in which R is hydrogen or alkyl of 1 to 6 carbon atoms, R' is hydrogen or methyl, and X is —O—, phenylene, —COO—alkylene—O—, —COO—alkylene— or —alkylene—O— in which alkylene has 1 to 6 carbon atoms, or combinations of such structural units, any portion of said vinyl copolymer not made up from said structural units being instead derived from a comonomer selected from the group consisting of methacrylic acid, lower alkyl and hydroxy alkyl esters of methacrylic acid, dialkyl aminoalkyl methacrylates, N-alkyl amides of acrylic and methacrylic acids, N-hydroxy- and N-alkoxy alkyl amides of acrylic and methacrylic acids, maleic anhydride, maleic acid, fumaric acid, alkyl esters of maleic and fumaric acids, N-vinyl carbazole, vinyl alcohol, vinyl chloride and styrene, and minor proportions of acrylonitrile and methacrylonitrile.

2. In a process for preparing a heat-foamable thermoplastic copolymer which comprises copolymerizing, at a temperature of the order of about 50 to 60° C. in the presence of 3 to 20 percent by weight urea or dimethylurea and a catalytically effective amount of an organic radical-forming catalyst, a monomer mixture comprising (A) 10 to 60 percent by weight acrylic acid, methacrylic acid or a combination thereof with (B) 20 to 60 percent by weight acrylonitrile, acrylamide, methacrylonitrile, methacrylamide or a combination thereof and (C) up to about 60 percent by weight of another monomer or other monomers copolymerizable with comonomers A or B, the improvement which comprises adding to the monomer mixture, before copolymerization, from about 0.5 to about 10 percent by weight of a vinyl copolymer soluble in said monomer mixture and at least 10 percent of which is made up of structural units of the formulae

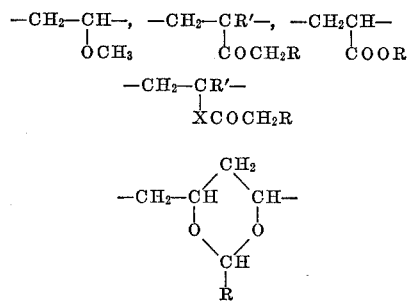

in which R is hydrogen or alkyl of 1 to 6 carbon atoms, R' is hydrogen or methyl, and X is —O—, phenylene, —COO—alkylene—O—, —COO—alkylene— or —alkylene—O— in which alkylene has 1 to 6 carbon atoms, or combinations of such structural units, any portion of said vinyl copolymer not made up from said structural units being instead derived from a comonomer selected from the group consisting of methacrylic acid, lower alkyl and hydroxy alkyl esters of methacrylic acid, dialkyl aminoalkyl methacrylates, N-alkyl amides of acrylic and methacrylic acids, N-hydroxy- and N-alkoxy alkyl amides of acrylic and methacrylic acids, maleic anhydride, maleic acid, fumaric acid, alkyl esters of maleic and fumaric acids, N-vinyl carbazole, vinyl alcohol, vinyl chloride and styrene, and minor proportions of acrylonitrile and methacrylonitrile.

3. A process as defined in claim 1 wherein the vinyl copolymer soluble in the monomer mixture is a vinyl chloride-vinyl acetate copolymer.

4. A process as defined in claim 1 wherein the vinyl copolymer soluble in the monomer mixture is an ethyl acrylatemethylmethacrylate copolymer.

5. A process as defined in claim 1 wherein the vinyl copolymer soluble in the monomer mixture is a β-acetoxyethyl methacrylate-methylmethacrylate copolymer.

6. A foamable copolymer prepared as defined in claim 1.

7. In a process for preparing a heat-foamed, stable copolymer which comprises heating a monomer mixture consisting essentially of (A) 10 to 60 percent by weight of acrylic acid, methacrylic acid or a combination thereof and (B) 20 to 60 percent by weight acrylonitrile, acrylamide, methacrylonitrile, methacrylamide or a combination thereof, with 3 to 20 percent by weight urea or dimethylurea in the presence of a catalytically effective amount of an organic radical-forming catalyst to a temperature of the order of about 150 to 250° C., the improvement which comprises adding to the monomer mixture, before copolymerization, from about 0.5 to about 10 percent by weight of a vinyl copolymer soluble in said monomer mixture and at least 10 percent of which is made up of structural units of the formulae

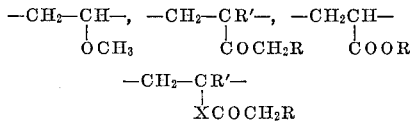

or

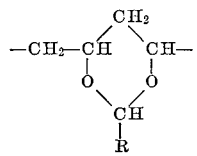

in which R is hydrogen or alkyl of 1 to 6 carbon atoms, R' is hydrogen or methyl, and X is —O—, phenylene, —COO—alkylene—O—, —COO—alkylene— or —alkylene—O— in which alkylene has 1 to 6 carbon atoms, or combinations of such structural units, any portion of said vinyl copolymer not made up from said structural units being instead derived from a comonomer selected from the group consisting of methacrylic acid, lower alkyl and hydroxy alkyl esters of methacrylic acid, dialkyl aminoalkyl methacrylates, N-alkyl amides of acrylic and methacrylic acids, N-hydroxy- and N-alkoxy alkyl amides of acrylic and methacrylic acids, maleic anhydride, maleic acid, fumaric acid, alkyl esters of maleic and fumaric acids, N-vinyl carbazole, vinyl alcohol, vinyl chloride and styrene, and minor proportions of acrylonitrile and methacrylonitrile.

8. A process for preparing a heat-foamed, stable copolymer which comprises heating a monomer mixture consisting essentialy of (A) 10 to 60 percent by weight of acrylic acid, methacrylic acid or a combination thereof and (B) 20 to 60 percent by weight acrylonitrile, acrylamide, methacrylonitrile, methacrylamide or a combination thereof, with 3 to 20 percent by weight urea or dimethylurea in the presence of a catalytically effective amount of an organic radical-forming catalyst to a temperature of the order of about 50 to 60° C. to form a thermoplastic, unfoamed copolymer and then heating said copolymer to a temperature of the order of about 150 to 250° C. to foam said copolymer, the improvement which comprises adding to the monomer mixture, before copolymerization, from about 0.5 to about 10 percent by weight of a vinyl copolymer soluble in said monomer mixture and at least 10 percent of which is made up of structural units of the formulae

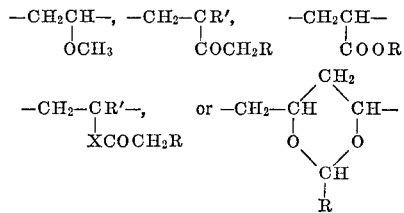

in which R is hydrogen or alkyl of 1 to 6 carbon atoms, R' is hydrogen or methyl, and X is —O—, phenylene, —COO—alkylene—O—, —COO—alkylene— or —alkylene—O— in which alkylene has 1 to 6 carbon atoms, or combinations of such structural units, any portion of said vinyl copolymer not made up from said structural units being instead derived from a comonomer selected from the group consisting of methacrylic acid, lower alkyl and hydroxy alkyl esters of methacrylic acid, dialkyl aminoalkyl methacrylates, N-alkyl amides of acrylic and methacrylic acids, N-hydroxy- and N-alkoxy alkyl amides of acrylic and methacrylic acids, maleic anhydride, maleic acid, fumaric acid, alkyl esters of maleic and fumaric acids, N-vinyl carbazole, vinyl alcohol, vinyl chloride and styrene, and minor proportions of acrylonitrile and methacrylonitrile.

9. A process as defined in claim 7 wherein the vinyl copolymer soluble in the monomer mixture is a vinyl chloride-vinyl acetate copolymer.

10. A process as defined in claim 7 wherein the vinyl copolymer soluble in the monomer mixture is an ethyl acrylate-methylmethacrylate copolymer.

11. A process as defined in claim 7 wherein the vinyl copolymer soluble in the monomer mixture is a β-acetoxyethyl methacrylate-methylmethacrylate copolymer.

12. A foamed copolymer prepared as defined in claim 7.

References Cited

UNITED STATES PATENTS

| | | | |
|---|---|---|---|
| 3,001,956 | 9/1961 | Meinel | 260—2.5 |
| 3,311,575 | 3/1967 | Graham | 260—2.5 |
| 3,417,038 | 12/1968 | Soltys | 260—2.5 |

FOREIGN PATENTS

| | | | |
|---|---|---|---|
| 1,368,383 | 6/1964 | France | 260—2.5 |

SAMUEL H. BLECH, Primary Examiner

W. J. BRIGGS, Sr., Assistant Examiner

U.S. Cl. X.R.

260—80.3, 85.5, 875, 881, 883, 884, 885, 886